(12) United States Patent
Zhong et al.

(10) Patent No.: US 11,599,577 B2
(45) Date of Patent: Mar. 7, 2023

(54) SYSTEM AND METHOD FOR CONTENT-HASHED OBJECT STORAGE

(71) Applicant: Seagate Technology LLC, Cupertino, CA (US)

(72) Inventors: Lijuan Zhong, Eden Prairie, MN (US); Krishnan Subramanian, Shakopee, MN (US); Mehmet Fatih Erden, St. Louis Park, MN (US); Jon D. Trantham, Chanhassen, MN (US)

(73) Assignee: Seagate Technology LLC, Fremont, CA (US)

( * ) Notice: Subject to any disclaimer, the term of this patent is extended or adjusted under 35 U.S.C. 154(b) by 252 days.

(21) Appl. No.: 16/597,911

(22) Filed: Oct. 10, 2019

(65) Prior Publication Data

US 2021/0109971 A1    Apr. 15, 2021

(51) Int. Cl.
| | |
|---|---|
| G06F 16/00 | (2019.01) |
| G06F 16/901 | (2019.01) |
| G06N 3/08 | (2023.01) |
| G06F 16/22 | (2019.01) |

(52) U.S. Cl.
CPC ...... *G06F 16/9014* (2019.01); *G06F 16/2255* (2019.01); *G06N 3/08* (2013.01)

(58) Field of Classification Search
CPC .. G06F 16/9014; G06F 16/152; G06F 16/137; G06N 3/08; G06N 3/088
USPC ........................................................ 707/747
See application file for complete search history.

(56) References Cited

U.S. PATENT DOCUMENTS

| | | | |
|---|---|---|---|
| 6,011,901 A | 1/2000 | Kirsten | |
| 6,597,660 B1 | 7/2003 | Rueda et al. | |
| 8,224,931 B1 | 7/2012 | Brandwine et al. | |
| 8,489,760 B2 | 7/2013 | Visharam et al. | |
| 8,599,266 B2 | 12/2013 | Trivedi et al. | |
| 9,087,098 B2 | 7/2015 | Lin et al. | |
| 2006/0195861 A1* | 8/2006 | Lee .................. | H04H 60/58 725/19 |
| 2007/0111185 A1 | 5/2007 | Krebs | |
| 2012/0026898 A1 | 2/2012 | Sen et al. | |
| 2012/0197856 A1 | 8/2012 | Banka et al. | |
| 2013/0318025 A1 | 11/2013 | Alemzadeh et al. | |
| 2014/0188912 A1* | 7/2014 | Watanabe ......... | G06F 16/2228 707/754 |
| 2015/0254342 A1* | 9/2015 | Yu .................. | G06F 16/71 707/769 |
| 2019/0327506 A1* | 10/2019 | Zou .................. | H04N 21/23406 |
| 2020/0005048 A1* | 1/2020 | Bharde ............. | H04N 21/23418 |
| 2020/0026949 A1* | 1/2020 | Alcock ............. | G06K 9/3233 |

(Continued)

OTHER PUBLICATIONS

U.S. Appl. No. 16/189,018, filed Nov. 13, 2018, Erden.

(Continued)

*Primary Examiner* — Vincent F Boccio
(74) *Attorney, Agent, or Firm* — Mueting Raasch Group

(57) ABSTRACT

Features are detected from a sensor signal via a deep-learning network or other feature engineering methods in an edge processing node. Machine-learned metadata is created that describes the features, and a hash is created with the machine-learned metadata. The sensor signal is stored as a content object at the edge processing node, the object being keyed with the hash at, the edge processing node.

20 Claims, 5 Drawing Sheets

(56) References Cited

U.S. PATENT DOCUMENTS

2020/0210623 A1\* 7/2020 Bueno ................... H04L 9/3247

OTHER PUBLICATIONS

Lawson et al., "Image compression using wavelets and JPEG2000: a tutorial", Electronics & Communication Engineering Journal, Jun. 2002, pp. 112-121.

\* cited by examiner

SYSTEM AND METHOD FOR CONTENT-HASHED OBJECT STORAGE

SUMMARY

The present disclosure is directed to a system and method that facilitates content-hashed object storage. In one embodiment, features are detected from a sensor signal via a deep-learning network or other feature engineering methods in an edge processing node. Machine-learned metadata is created that describes the features, and a hash is created with the machine-learned metadata. The sensor signal is stored as a content object at the edge processing node, the object being keyed with the hash at the edge processing node.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
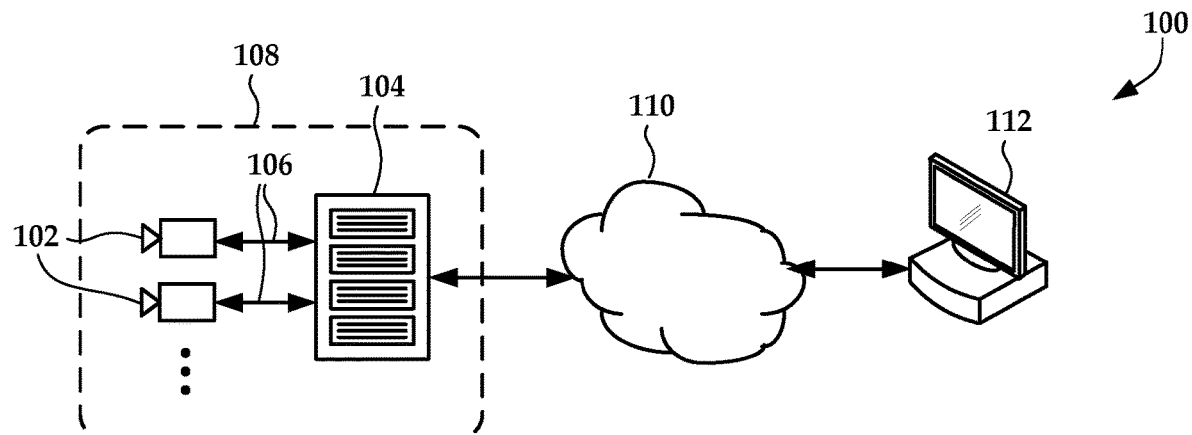
FIGS. 1-3 are diagrams of edge processing networks according to example embodiments.

The present disclosure generally relates to object-based data storage. In general-purpose computing devices (e.g., personal computers, mobile devices), storage devices such as hard disk drives (HDDs) and solid-state drives (SSDs) are usually configured as block storage devices. Generally, this means the storage device presents the storage media (e.g., disks, flash memory) as a series of data blocks identified by addresses, e.g., logical block addresses. In disk drives, these blocks would generally be directly mapped to the disk sectors on which the data was stored, although other arrangements (e.g., SSDs) may utilize a more flexible mapping of the logical to physical addresses.

Regardless, a block storage device receives access commands from a host machine, such as reads and writes that are targeted to logical block addresses. The storage device services these requests without regard to the data that is being stored or the context in which the data is being used. The data stored in the blocks and associated structures are determined at a higher level of abstraction, e.g., via a disk controller card, host operating system, etc. For example, an operating system may implement a filesystem that governs how data hierarchies (e.g., directory trees) and data objects (e.g., files, streams) are defined and mapped to the underlying block addresses. The specific structures of the filesystem are stored at predefined block addresses as filesystem metadata.

While operating system filesystems that utilize block access storage are still commonly-used, a different storage architecture known as object storage or object-based storage has been developed. In object storage, data are managed as objects, which include not only the underlying data of interest (e.g., pixels that define an image), but also includes metadata and a globally unique identifier. The underlying details of the storage (e.g., the physical addresses on which the data is stored) is abstracted away from the higher levels, e.g., applications. Object storage can be implemented at many different levels, e.g., the operating system, within the data storage device, within an interface therebetween. The present disclosure is directed to storage devices that implement object-based storage within the data storage device itself, such that the storage device and host communicate using object identifiers instead of (or in addition to) block addresses.

Device-level object-based storage has some advantages over traditional storage architectures. For example, the device can manage aspects of the storage (e.g., data integrity, deduplication, indexing, security, etc.) without the intervention or involvement of the higher levels of the computer system (e.g., drivers and utilities of the operating system, as well as the users who administer those systems). The interface between the object storage device and the host computer utilizes commands to manage objects (e.g., create, delete, get/set attributes, read, write modify, etc.) instead of the block-oriented commands used by a conventional storage device. While the embodiments below may be described as storage-device-level implementations, it will be understood that these concepts may be applied on systems where the object-based storage is located outside of the storage device, e.g., via a controller card between the host computer and a block storage device.

The disclosure is directed to an implementation of an object storage device referred to herein as a content-based or content aware storage device. Generally, a content-based storage device has information that is either preconfigured or added programmatically that has knowledge of the content of the stored objects. This knowledge may include binary formats used to store the object data, metadata embedded in the objects via external sources, processing that can be performed on the object (e.g., indexing, signal processing, machine learning), access modes typically used to access the object (e.g., download versus streaming), etc.

Embodiments described herein utilize a content-hashed, active object storage architecture for information storage. The architecture provides content-based information archiving and efficient information retrieval for general-purpose data store tasks and can be flexibly integrated to broad customer systems. Through in-store computing (e.g., processors that are enclosed in a drive housing), the data source and content are hashed into unique keys, which are later used to store data as (key-value) pairs. This hashing is based on an algorithm that is customized for the specific types of content known to the storage device. The content-hashed object store uses the object keys to carry rich metadata which is encapsulated within the stored objects. Information retrieval can be conducted by searching on smaller sized keys instead of larger sized values while offloading the computing work to the drive without adding burden to customer systems that integrate the storage devices.

The object keys can also evolve by appending a new key segment when additional set of metadata becomes available after objects get stored. For example, when new knowledge about the object content is generated in post-processing, the new content descriptor can be integrated with the existing hash content value, e.g., appended to the end of the hash, recalculating the hash based on the new content descriptors. This allows access to previous learned knowledge representations, and is extensible to facilitate new learned knowledge representations. Further data analysis can be continued on subsets narrowed down by already learned data content coded hash key. For example, if the knowledge representation which previously included face recognition is extended to identify certain wearable items near the face such as hats, scarves, glasses, headphones, etc., these descriptors may be hashed and used to update the original hash (or part thereof) indicating the existence/and or features of the newly learned features items. This hash can still retain any originally detected facial features, such that previous searches on those features will still obtain the same results.

Figure 2:
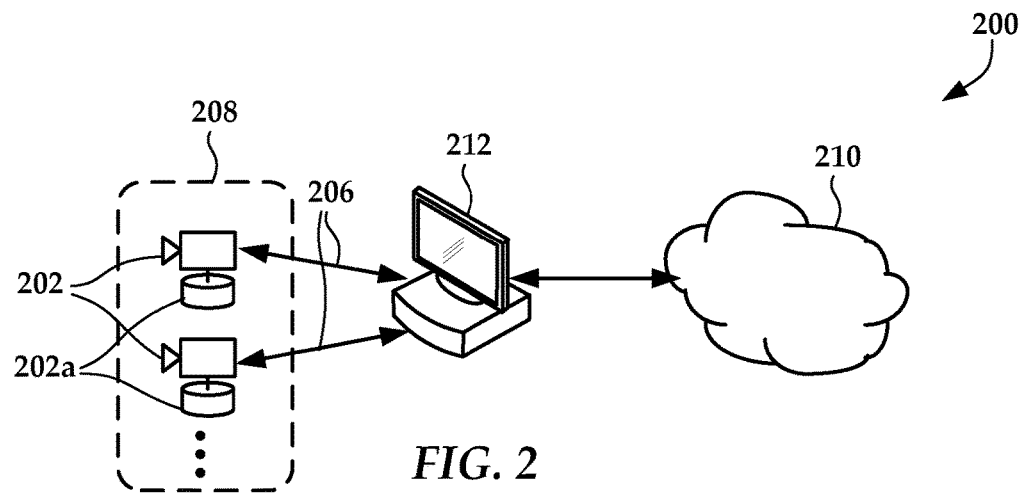
Figure 3:
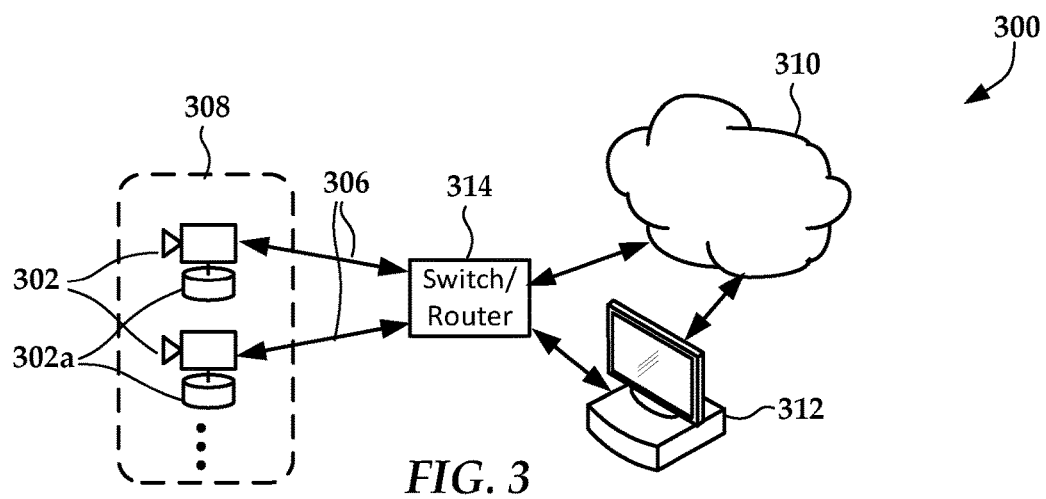

In FIGS. 1-3, diagrams illustrate systems 100, 200, 300 that can use object storage devices according to example embodiments. In FIG. 1, the system 100 includes one or more sensors 102 (here shown as video cameras) coupled to a storage array 104 via signal lines 106. The signal lines 106 may be analog or digital, and multiple signals may be multiplexed onto an individual line. The storage array 104 collects data gathered by the sensor 102 and disseminates it to cloud storage 110, which may include data centers accessible via private or public internetworks. The data may be pulled from the storage array 104 by cloud storage servers and/or the storage array 104 may push the sensor data to the cloud storage servers. The sensor data may be accessed via a client computer 1112 coupled to the cloud storage 110.

The sensors 102, storage array 104, and signal lines 106 may be collectively consider part of an edge computing layer 108. Generally, the edge computing layer 108 includes relatively low-powered devices (at least in terms of processing power and storage capacity) that collect, process, and store at least some sensor data before it is sent to the cloud storage 110 for larger-scale dissemination and longer-term storage. For purposes of this disclosure, edge computing components are considered to have at least some capability to gather, process, and store data, although such functions may be distributed to different components.

In FIGS. 2 and 3, diagrams illustrate alternate edge layer arrangements. In both figures, sensors 202, 302 include integrated storage 202a, 302a. As such, these devices 202, 302 may perform all of the edge processing functionality. In FIG. 2, signal lines 206 couple the sensors 202 to a computer 212, which may be configured as one or both of a client computer or a server. The computer 212 may optionally be configured to send sensor data to a cloud storage 210. In FIG. 3, network signal lines 306 couple the sensors 302 to a switch router 314, which enables sending the sensor data directly to a cloud storage 310 and/or an individual computer 312.

Many edge computing applications, such as video surveillance systems that use conventional computing architectures and file-based storage system, are facing challenges such as data scalability, real-time response latency, increasing need for power-consuming data analytics processing. The disclosure describes an edge computing architecture based on active object storage. The architecture, which can be implemented in the edge layers such as 108, 208, and 308, provides in-store computing, flexible computing and storage scalability, and efficient information archiving and retrieval needed for high-performance surveillance.

The architecture implements content-based object storage that data, such as video/image data, is saved as a (key, value) pair with the key representing the data source and content. Computing work is distributed to multiple object-based computing storage modules (also referred to herein as active object store modules) to reduce computing burden on customer premises. The use of the object-based storage modules enables or expand real-time computing capability without transmitting large amounts of data to remote data center, cloud storage, etc. This arrangement offers flexible scalability of both computing and storage capacity.

Due to advances in processor technology, modern low-power processing units (e.g., mobile device processors) can have computing performance that approaches that of desktop processors. This allows a storage device to include significant processing overhead while retaining the small form factor and relatively low power-consumption of a conventional HDD or SSD. Because much of the processing is done at the edge layer by the object-based storage modules, the architecture allows computing to be performed closer to the application (e.g., the region being surveilled for video surveillance applications), which reduces the response latency and data transmission requirements. Because the object-based storage modules are self-contained computing units, they can be deployed as add-ons to existing customer data distribution systems or data creation devices, or as stand-alone systems.

While some applications can provide good performance using conventional commodity computing hardware and architectures, applications such as video surveillance are pushing the performance boundaries of these systems. For example, a modern video surveillance system may process a large number (e.g. >128) of channels that require fast read/write. The system may need large storage capacity for video and video metadata storage, as well as management of the data (e.g., generation of thumbnail images, indexing). Other features such as real time video analysis, efficient playback, and video search can require large amounts of processing and network bandwidth if implemented entirely using a centralized cloud storage/compute facility.

Figure 4:
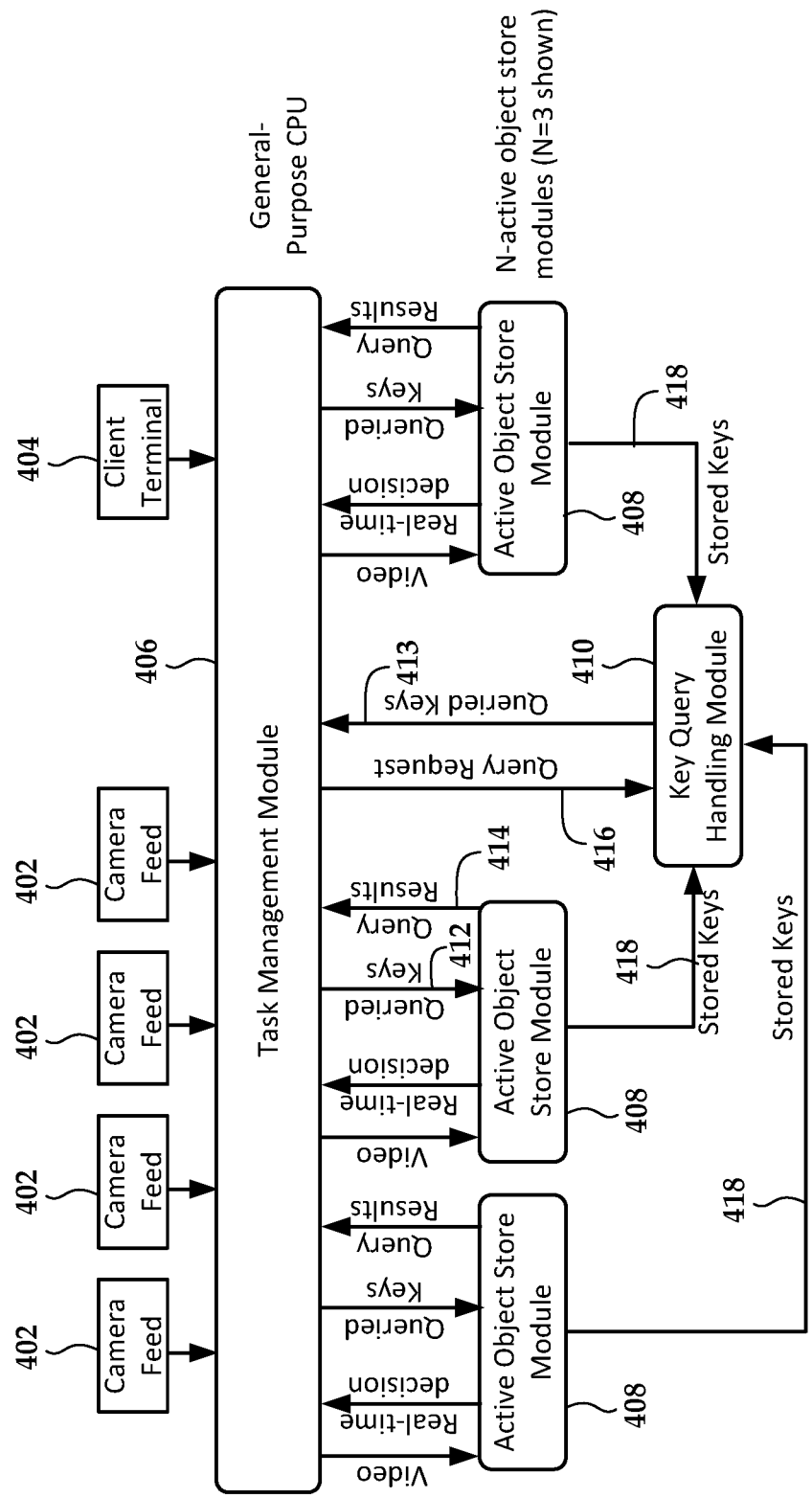
FIG. 4 is a block diagram of an edge processing architecture according to example embodiments.

In FIG. 4, a diagram shows an edge processing architecture according to example embodiments. This diagram again illustrates a video surveillance system as an example application but may be adapted to other data gathering and processing applications. The functional units in FIG. 4 are labeled as modules, and for this purpose the modules may be implemented as individual nodes, e.g., network nodes, object storage nodes of a storage array, etc. An array of camera feed signals 402 are input to a task management module 406. The task management module 406 may include a general-purpose central-processing unit (CPU) that handles data stream and task distribution. The task management module 406 may be implemented using a dedicated CPU, part of existing customer system, such as a network video recorder (NVR), embedded CPU in data creation device, system-on-a-chip (SoC), etc. Generally, the task management module 406 manages data and computation distribution to active object storage modules 408 as well as pre-distribution data preparation, which may include transform on the sensor signal 402, such as a discrete wavelet transform, a Fourier transform, reduction in resolution, conversion to different coloring/shading scheme, etc. This transform can reduce the size of the data distributed but still meet the requirement for knowledge presentation leaning at the feature extractor 604. The task management module 406 also manages query requests 416 and distribute subtasks to correspondent modules 408, 410 as indicated by query keys 412, 413 and result 414.

The system uses an array of N+1 object-based computing storage modules 408, 410. Each module 408, 410 can located in one active object storage unit. There are two types of modules shown: N-active object store modules 408 and a key-query handling module 410. Generally, the object store modules 408 are configured to learn specific knowledge representation that can be used for real-time detection or decision making. For example, if the system is used for face detection, the object store modules 408 may include a neural network or other machine learning processor that is pre-trained to learn face representations in a single frame or groups of frames. The object store modules 408 store the video content using a content-based hash key, which will be described in greater detail below.

The key-query handling module 410 stores keys associated with stored objects across all active object store modules 408. Queries that are received, e.g., from client terminal 404 via the task management module 406, are sent as a query request 416 to the key-query handling module 410. The key-query handling module 410 handles query requests 416 by processing key ranges and locating matching stored object keys. One or more keys 413 are returned in response to the requests 416. The task management module 406 uses these keys 413 to direct the query to one of the active store modules 408 that has a match, e.g., as indicated by query key 412. Any active store modules 408 that have a match to the query return a result, e.g., result 414, and this can be directed to an end user, e.g., client terminal 404.

Figure 5:
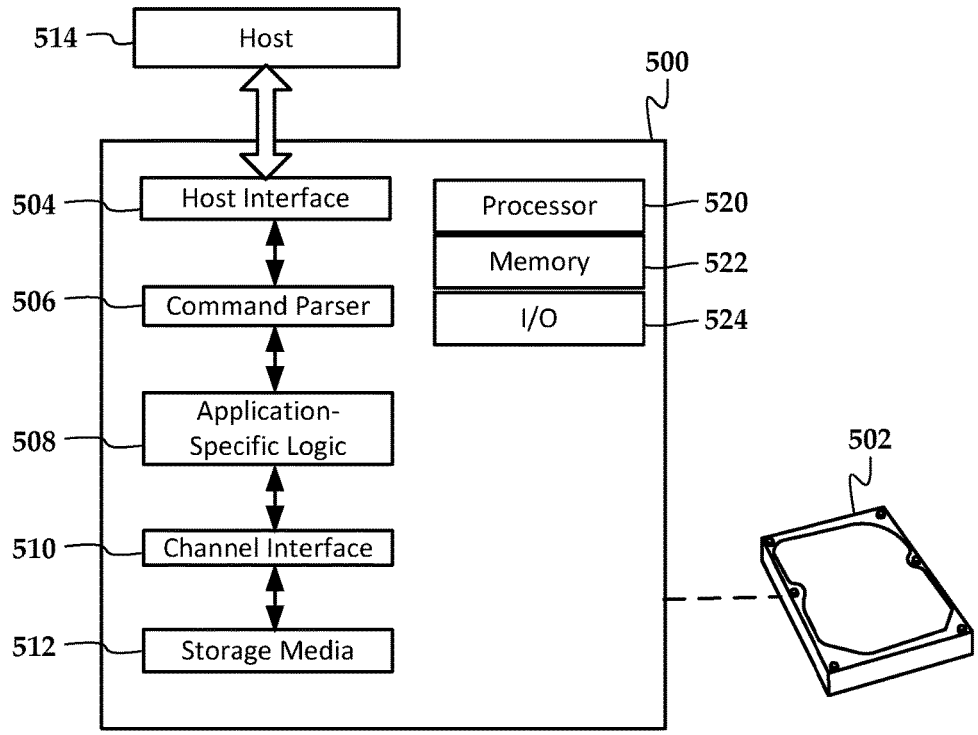
FIG. 5 is a block diagram of an object storage device according to example embodiments.

Note that an active object data store device can be flexibly configured to perform different functions, as indicated by the active object store module 408 and key-query handling module 410 in FIG. 4. In FIG. 5, a block diagram shows a diagram of hardware and software components of an object storage device 500 according to an example embodiment. The object storage device 500 includes one or more processors 520, such as a CPU, co-processors, digital signal processors, application-specific integrated circuits (ASIC), etc. The processor utilizes memory 522, e.g., random-access memory (RAM) to temporarily hold instructions and data as it is being processed. The object storage device 500 also includes input/output (I/O) circuitry 524 that facilitates communications between the processor 520 and other hardware (e.g., host interface 504, channel interface 510, storage media 512) discussed below.

The object storage device 500 may be entirely enclosed within a housing 502 that conforms to mechanical and electrical drive enclosure standards, e.g., 1.8", 2.5", 3.5", M.2 NVMe, M.2 SATA, etc. These standards may also define aspects of a host interface 504 that is used to couple the object storage device 500 to a host 514. For example, the connector type and layout of the host interface 504 hardware, power requirements, connector location, etc., may all conform to the appropriate drive standards so that the device 500 can easily be integrated into existing infrastructure, e.g., housings, racks, etc.

The host interface 504 facilitates communications between the host 514 and a command parser 506 that interprets incoming commands, performs the required actions, and provides the appropriate responses back to the host 514. In this example, the communications will include object-based commands instead of or in addition to block-access commands. The object-based commands are used by the command parser 506 to perform functions via an application-specific logic section 508. Generally, the application-specific logic section 508 can be configurable to perform a specific function, e.g., configured one time upon initialization or dynamically configurable and reconfigurable during use. This allows the device 500 to perform the different functions of modules 408, 410 shown in FIG. 4, for example, including machine learning and the forming of content-hashed keys. Note that configuration of the application-specific logic section 508 may also be used to extend the functionality of the command parser 506, e.g., adding/changing commands, adding/changing data types, etc.

Data storage is still an objective of the object storage device 500, and so it includes a channel interface 510 that facilitates access to one or more types of storage media 512. The functionality of the channel interface 510 and storage media 512 may use technology like that of conventional data storage drives. Because the channel interface 510 is directly accessible by the application-specific logic 508, the device 500 may be able to perform some data operations internally as fast or faster than if the data had to be sent via the host interface for the same processing, even if the processor 520 of the device 500 is not as powerful as that of the host. This may include cases where data needs to be regularly cycled in and out of the media 512, preferably at high data transfer rates.

Note that for interoperability with other systems (e.g., sensors such as cameras) the object storage device 500 may include facilities at the host interface 504 (or at other interfaces) that facilitate transferring external data into the device 500 via I/O circuitry 524. For example, the storage device 500 may implement a known data transfer interface such as file transfer protocol (FTP), real-time streaming protocol (RTSP), etc., that existing sensors may already be able to utilize to transfer data over networks and/or direct data lines. In other embodiments, the sensor signals may be received in an analog format, in which case the object storage device 500 may include analog circuitry to process the signals, and an analog-to-digital converter to convert the signal to a digital form.

Figure 6:
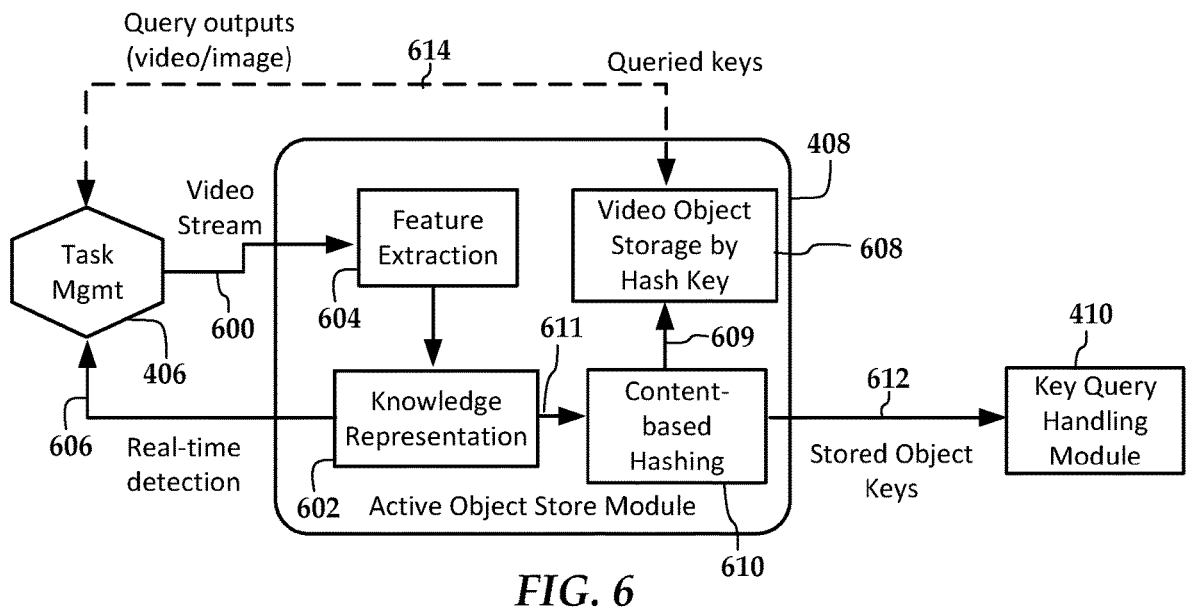
FIG. 6 is a block diagram of diagram an active storage module according to example embodiments.

Generally, an object storage device 500 can be configured to continuously receive, process, and store data independently of a host, although a host computer may also be used to manage some aspects (e.g., functions of task management module 406 in FIG. 4). In order to handle large processing tasks in parallel, a system may deploy large numbers of object storage devices 500 that operate as active store modules 408 described in relation to FIG. 4. In FIG. 6, a diagram shows additional details of the active storage module 408 according to an example embodiment. The functions of the active storage module 408 can be implemented in an object data store such as shown in FIG. 5 or may be implemented using a non-object-based storage, e.g., using a storage interface processor. Sensor data/signals 600 are received at the active storage module 408 and processed by a feature extraction function 604.

The feature extractor 604 may build derived values (features), from the input sensor signal 600, intended to be informative and non-redundant, facilitating the subsequent learning and generalization steps, and in some cases leading to better data interpretations. The feature extraction methods may be low-level feature engineering that use domain knowledge of the data to create features that facilitate machine learning algorithms. It may also use such techniques as deep learning, convolutional neural networks, to learn high level features of the data. Generally, a neural network, generative adversarial network, support vector machine or other machine learning structure may be trained to detect the features of interest for the appropriate sensor data type. The machine learning structure process the incoming data stream 600 to extract features based on classification, anomaly detection, etc.

The feature extractor 604 sends the features to a knowledge representation function 602. The knowledge representation function 602 maps the incoming features to metadata that can be used at higher levels of abstraction within the system. The knowledge representation function 602 uses trained machine learning models to learn knowledge of interest for the appropriate sensor data type, such as, classification, anomaly detection, etc. For example, a neural network may be configured to produce a probability that a feature (e.g., person, vehicle) is present in a video or still image, and if the probability exceeds a threshold, the features is considered detected and given a label that is used consistently throughout the system, e.g., "person," "vehicle." These labels may be human-readable text or numeric codes. In either case, this machine learned metadata describes characteristics of the sensor data that are of interest to the system designer and can be used to search within the stored data.

The machine-leaned metadata can be used to produce real time detections/decisions 606 that can be sent to the task manager 406 via path 606. The alerts can be tailored to be triggered if a recently identified feature in the incoming data stream 600 satisfies a predefined condition, e.g., one that is set by a client via terminal 404 in FIG. 4. Machine-learned metadata 611 from the knowledge representation module 602 is also used by a content-based hashing function 610. The content-based hashing function 610 processes the metadata 611 to produce a compact representation of the knowledge in the form of a hash key 609. The hash key can be formed such that one or more bits are set to one or zero based on whether the content meets the search criteria for a particular feature. The key can also include similarity-preserving vectors that are mapped from the features extracted by feature extractor 604.

The sensor data stream 600 is stored as object value in the storage media 608 together with the content-based hash key 609 as an object key. The hash key 609 is a globally unique identifier (GUID) associated with the content, or a portion thereof, the data source, such as data channel, an identifier of the active storage module 408, e.g., a node identifier, network address, etc. The content-based hash key 609 is also stored with the key query handing module 410 via path 612.

The content-hashed object key 609 classifies the stored object content based on the learned knowledges and features. This allows querying the stored content based on a particular segment of the hash key. Each segment of the key may represent different type of knowledge representations, for example, whether a face is present, whether the face is male/female, if glasses are worn, etc. Any content that is keyed within that hash segment will be flagged as matching the query. These representations may not mutually exclusive but may use differently trained classifiers in the feature extractor 604. These classifiers can be set up in series or in parallel. As an example of the former, if a face is detected, then that image can be fed into other classifiers that look for specific facial features, context, identities, etc. As an example of the latter, the classifiers may look for multiple objects that may be in the same scene, e.g., people, vehicles, etc.

By storing the results as keys, information retrieval can be performed based on keys instead of searching the content itself, which could be time-consuming for large data structures such as video files. The task manager 406 may first query the key query handler 410 (see FIG. 4) to obtain a list of matching keys, each of which satisfies the query and uniquely identified an object stored in an active object store module 408. As indicated by dashed line 614, the queried key is used to directly access the requested video object by the key. Note that the data pathways in FIG. 6 with solid lines indicate communications that occur in a real-time mode while the dashed lines indicate communications that occur in a search mode.

Figure 7:
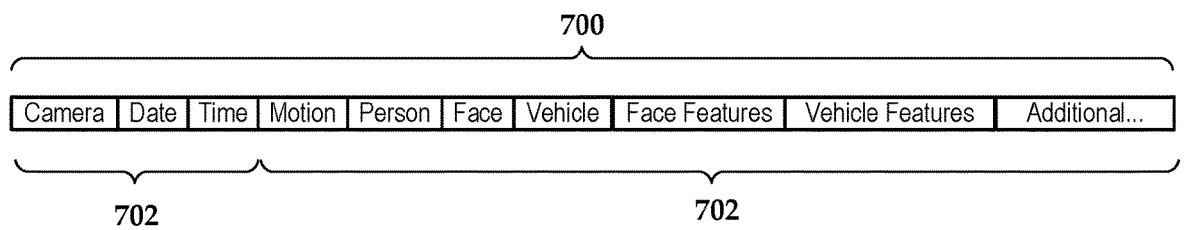
FIG. 7 is a block diagram of a content-hashed key according to an example embodiment.

In FIG. 7, a diagram shows a content-hashed object key 700 according to an example embodiment. The key is stored with the data and used a descriptor of the source and content of the frame/video. The key includes metadata 702 that may be inserted by the sensor and/or the task manager 406, such as a camera identifier, date, time, frame number(s), etc. Fields 704 may include binary values reflect desired descriptors of the object, such as whether subjects such as motion, faces, vehicles, etc., were detected. Fields 704 may also include segments that reflect detected features of these subjects. Each segment can be semantic description of a specific subject, such as object tag, color, shape, vehicle plate number, etc., learned by knowledge representation 602. The segment can also be similarity-preserving vectors that are mapped from features of a specific subject, for example, those extracted at feature extractor 604. During query, at the key-query handling module 410, the searched-for features in the query request is processed into respective fields of a query code. The list of key stored will be evaluated against such generated query key for matching likelihood. For example, the respective field of the stored keys may be combined into a Bloom filter such that matching bit values of the hashed value with corresponding bits of a query key indicates a high likelihood that a searched-for feature is included in the respective field. The respective field of the stored keys and query key may also be used as input for a classification/clustering model trained by machine learning methods, such as k-NN classification, k-means or agglomerative clustering, to classify or learn the similarity of the stored keys against the query key.

Figure 8:
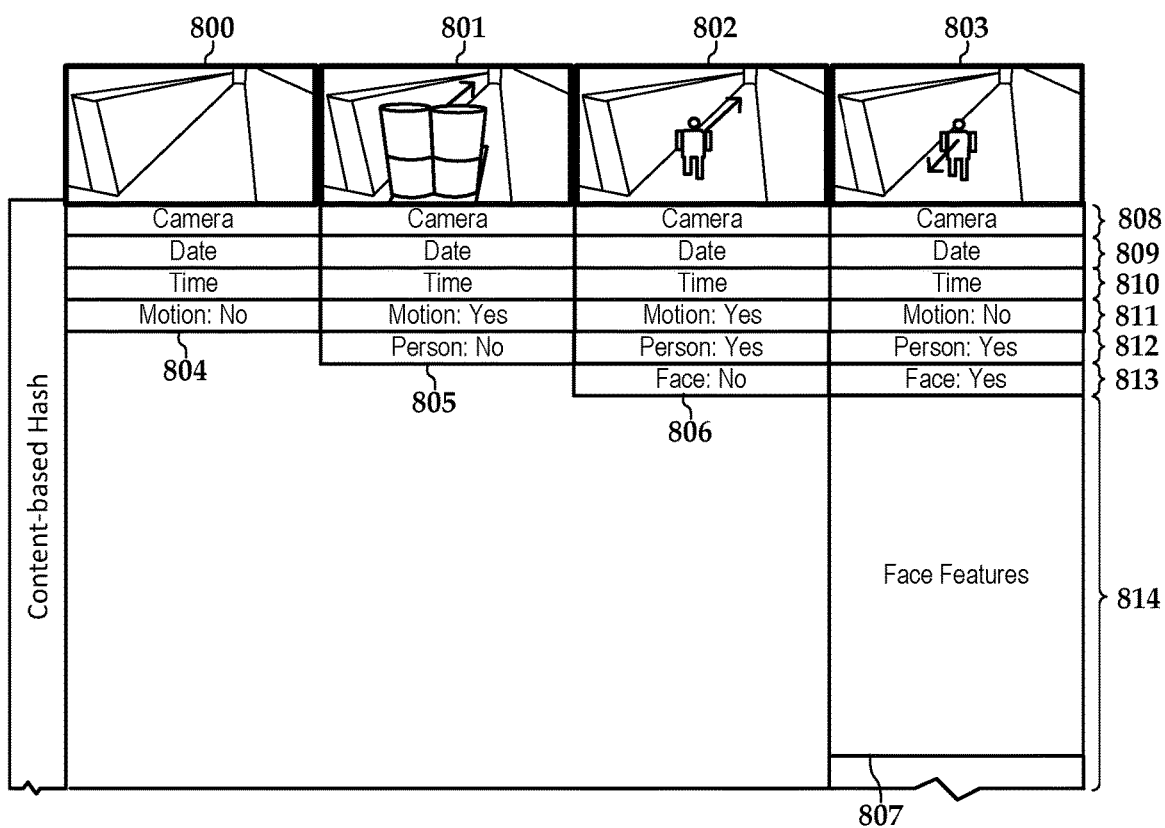
FIG. 8 is a block diagram showing content-hashed object keys created under scenarios according to example embodiments.

In FIG. 8, a diagram shows use of content-hashed object keys under example scenarios. Images 800-803 represent video frames of the same scene (a hallway) taken at different times with different detectable features in the frame. Content-hashed object keys 804-807 are generated by the object-based storage and stored with the respective frames 800-803 and/or video segments to which the frames 800-803 belong. In all cases, fields 808-810 can be filled in without any machine learning, as they are generated e.g., by camera firmware and system clocks. Starting with field 811, additional data is added that is detected via machine learning. In this example, a subsequent field is not added (e.g., field 812) unless the immediately preceding field indicates that a broader feature category is detected. In this case, the feature categories in fields 811-814, from broadest to narrowest are detection of motion, detection of a person, detection of a face, and detected facial features. Note that in other embodiments, the fields may not require this hierarchy. For example, if a person is detected in a scene but is not moving, field 812 may still be populated (as well as fields 813, 814 if applicable) even if field 811 indicates 'no.'

Figure 9:
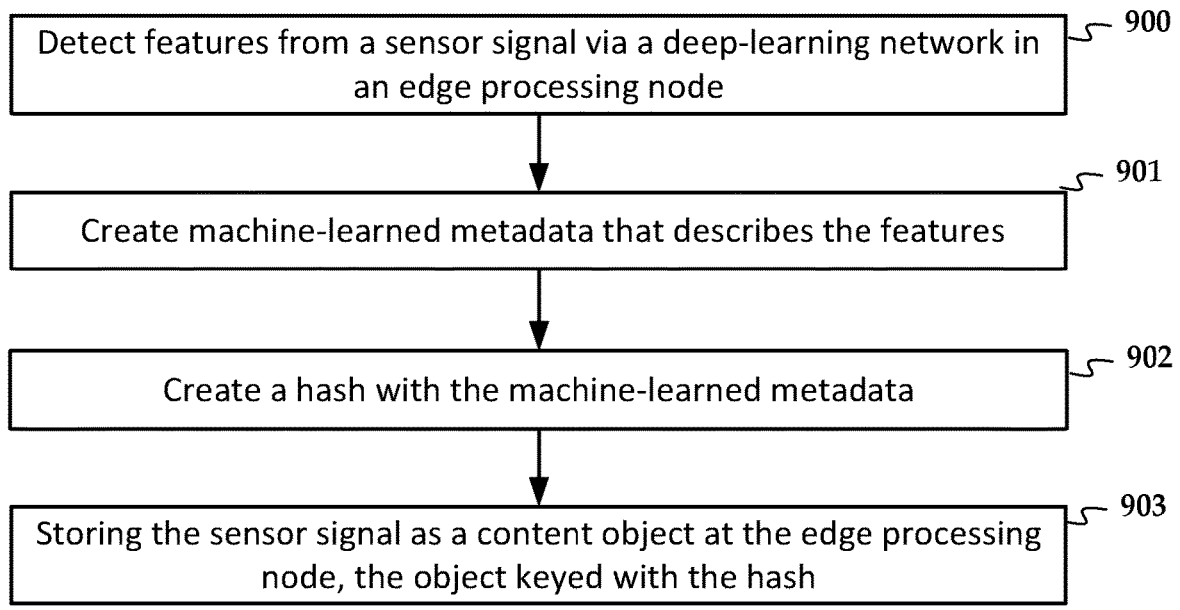
FIGS. 9 and 10 are flowcharts of methods according to example embodiments.

In FIG. 9, a flowchart shows a method according to an example embodiment. The method involves detecting 900 features from a sensor signal via a deep-learning network in an edge processing node and creating 901 machine-learned metadata that describes the features. A hash is created 902 with the machine-learned metadata and the sensor signal is stored as a content object at the edge processing node. The object keyed with the hash.

Figure 10:
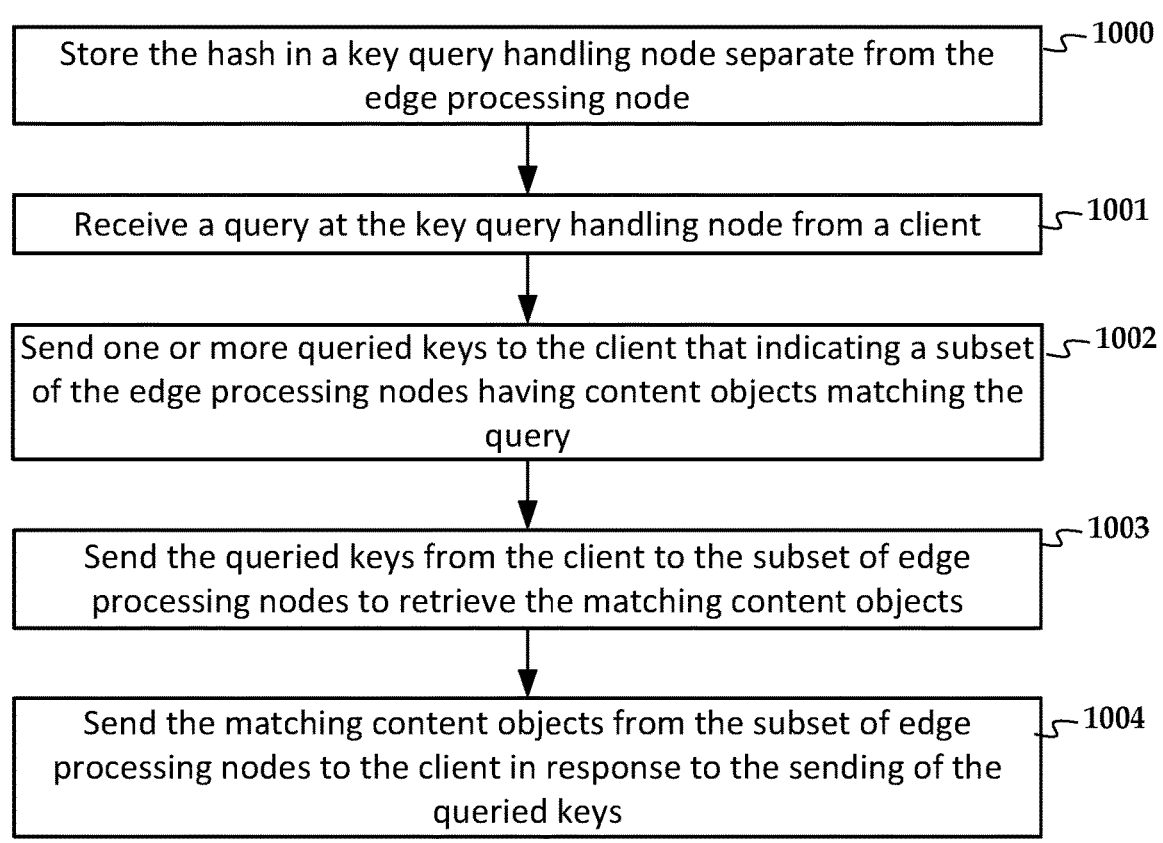

In FIG. 10, a flowchart shows a method according to another example embodiment that includes additional steps that may take place after the processing shown in FIG. 9. The method involves storing 1000 the hash in a key query handling node separate from the edge processing node. The hash facilitates access to the content stored at the edge processing node. The key query handling module stores hash keys for content objects stored on a plurality of edge processing nodes. The method further involves receiving 1001 a query at the key query handling node from a client and sending one or more queried keys to the client 1002. The queried keys indicate a subset of the edge processing nodes having content objects matching the query. The queried keys are sent 1003 from the client to the subset of edge processing nodes to retrieve the matching content objects. The matching content objects are sent 1004 from the subset of edge processing nodes to the client in response to the sending of the queried keys.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor, Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   detecting a first feature from a sensor signal via a deep-learning network in an edge processing node;
   creating first metadata indicating that the first feature has been detected in the sensor signal via a machine-learning processor that is pre-trained to detect the first feature, the first metadata describing the first feature using a label that is used consistently throughout a system in which the edge processing node operates;
   creating a hash key with the first metadata, wherein the hash key comprises segments that represent different types of knowledge representations, the label representing one of the types of knowledge representation;
   storing the sensor signal as a content object on an object-based storage at the edge processing node, the content object keyed in the object-based storage with the hash key, wherein the object-based storage manages the content object with a host based on an object identifier instead of block addresses;
   extending the machine learning processor to learn a new feature in the sensor signal;
   post-processing the content object to detect the new feature in the content object and creating new metadata indicating detection of the new feature; and
   creating an updated hash key with the new metadata, the updated hash key retaining a hash of the first metadata such that previous searches for the first feature on the updated hash key will obtain the same results as searching the hash key.

2. The method of claim 1, wherein the hash key is encapsulated within the content object.

3. The method of claim 1, wherein the edge processing node is a data storage drive that conforms to mechanical and electrical drive enclosure standards.

4. The method of claim 1, wherein the sensor signal comprises a video signal and wherein the first feature comprises any combination of motion, people, and faces.

5. The method of claim 1, further comprising storing the hash key in a key query handling module separate from the edge processing node, the hash key facilitating access to the content object stored at the edge processing node, the key query handling module storing hash keys for content objects stored on a plurality of edge processing nodes.

6. The method of claim 5, further comprising:
   receiving a query at the key query handling module from a client;
   sending one or more queried keys to the client, the queried keys indicating a subset of the edge processing nodes having the content objects matching the query;
   sending the queried keys from the client to the subset of edge processing nodes to retrieve the matching content objects; and
   sending the matching content objects from the subset of edge processing nodes to the client in response to the sending of the queried keys.

7. The method of claim 1, further comprising determining that the machine-learned metadata matches a predefined condition defined by a client, and sending a real-time alert to the client in response thereto.

8. The method of claim 1, wherein creating the updated hash key comprises creating a new hash of the new metadata and appending the new hash to the hash key.

9. The method of claim 1, wherein the new feature is associated with a newly learned knowledge representation by the machine-learning processor.

10. The method of claim 1, wherein the Object-based storage abstracts physical addresses away from the host, the host managing the content object based on the object identifier instead of block addresses, the object-based storage encapsulating rich metadata with the content object, the rich metadata being searchable using the hash key.

11. An edge processing node, comprising:
   a processor;
   a data storage medium configured for object-based storage, wherein the object-based storage manages objects with a host based on object identifiers instead of block addresses;
   input/output circuitry coupled to the processor and the data storage medium and configured to receive a sensor signal; and
   memory that stores instructions that are operable by the processor to:
      detect a first feature from the sensor signal via a deep-learning network or other feature engineering method;
      create first metadata indicating that the first feature has been detected, via a machine-learning processor that is pre-trained to detect the first feature, the first metadata describing the first feature using a label that is used consistently throughout a system in which the edge processing node operates;

create a hash key with the first metadata, wherein the hash key comprises segments that represent different types of knowledge representations, the label representing one of the types of knowledge representation;

store the sensor signal as a content object in the data storage medium, the content object keyed in the object-based storage with the hash key;

extend the machine learning processor to learn a new feature in the sensor signal and create new metadata indicating detection of the new feature;

post-process the content object to detect the new feature in the content object; and create an updated hash key with the new metadata, the updated hash key retaining a hash of the first metadata such that previous searches for the first feature on the updated hash key will obtain the same results as searching the hash key.

12. The edge processing node of claim 11, wherein the edge processing node is a data storage drive that conforms to mechanical and electrical drive enclosure standards.

13. The edge processing node of claim 11, wherein the sensor signal comprises a video signal and wherein the first feature comprises any combination of motion, people, and faces.

14. The edge processing node of claim 11, wherein the processor is further operable to store the hash key in a key query handling module separate from the edge processing node, the hash key facilitating access to the content object stored at the edge processing node, the key query handling module storing hash keys for content objects stored on a plurality of edge processing nodes and processing query requests to identify matching keys stored.

15. The edge processing node of claim 11, wherein the processor is further operable to determine that the machine-learned metadata matches a predefined condition defined by a client, and send a real-time alert to the client in response thereto.

16. The edge processing node of claim 11, wherein creating the updated hash key comprises creating a new hash of the new metadata and appending the new hash to the hash key.

17. A system comprising:

a plurality of sensors that generate a respective plurality of data streams;

a task management module that directs the plurality of data streams to a respective plurality of active object store nodes, each of the active object store nodes comprising an object-based storage wherein the object-based storage manages objects with a host based on object identifiers instead of block addresses, the active object storage nodes operable to:

detect a first feature from a data stream of the plurality of data streams via a machine-learning processor that utilizes a deep-learning network or other feature engineering methods pre-trained to detect the first feature;

create first metadata indicating that the first feature has been detected, the first metadata describing the first feature using a label that is used consistently throughout the system;

create a hash key with the first metadata, wherein the hash key comprises segments that represent different types of knowledge representations, the label representing one of the types of knowledge representation;

store the data stream as a content object in one of the active object store nodes, the content object keyed in the object-based storage with the hash key;

extend the machine learning processor to learn a new feature in the data stream;

post-process the content object to detect the new feature in the content object and create new metadata indicating detection of the new feature; and create an updated hash key with the new metadata, the updated hash key retaining a hash of the first metadata such that previous searches for the first feature on the updated hash key will obtain the same results as searching the hash key; and a key query handling module operable to:

receive and store the hash keys from the active object store nodes;

receive a query via the task management module;

process the query and identify matches in the stored hash keys; and return a list of the hash keys that satisfy the query, the list of the hash keys facilitating access to a subset of the content objects stored at a subset of the active object store nodes.

18. The system of claim 17, wherein the hash key is encapsulated within the content object.

19. The system of claim 17, wherein the active object store nodes are implemented as data storage drives that conform to mechanical and electrical drive enclosure standards.

20. The system of claim 17, wherein creating the updated hash key comprises creating a new hash of the new metadata and appending the new hash to the hash key.

* * * * *